United States Patent [19]

Guerrero

[11] 4,004,501
[45] Jan. 25, 1977

[54] TACO HOLDING TRAY

[76] Inventor: Lois L. Guerrero, 84 Pukihae St., Bayshore Tower, Hilo, Hawaii 96720

[22] Filed: Dec. 29, 1975

[21] Appl. No.: 644,945

[52] U.S. Cl. .................................. 99/426; 220/23.8
[51] Int. Cl.² ..................... A23P 1/00; A47J 43/20
[58] Field of Search .... 99/426, 428, 441, 380–381, 99/382–383, 384; 206/72; 220/20, 23.8; 224/48 R, 48 A

[56] References Cited

UNITED STATES PATENTS

| 199,595 | 1/1878 | Stroub | 99/426 |
| 833,529 | 10/1906 | Jones | 99/450 X |
| 1,568,742 | 1/1926 | Jung | 220/23.8 X |
| 1,615,122 | 1/1927 | Gordon | 99/383 |
| 1,715,103 | 5/1929 | Simmons | 99/383 |
| 2,647,454 | 8/1953 | Shelley | 99/441 |
| 2,741,901 | 4/1956 | Silos | 99/441 X |
| 2,957,973 | 10/1960 | Torrez | 99/426 |
| 3,363,544 | 1/1968 | Eriksen | 99/426 |
| 3,511,172 | 5/1970 | Jones | 99/426 |
| 3,782,582 | 1/1974 | Lybbert et al. | 220/23.8 X |

FOREIGN PATENTS OR APPLICATIONS

| 9,062 | 1906 | United Kingdom | 224/48 |

Primary Examiner—Harvey C. Hornsby
Assistant Examiner—Arthur O. Henderson
Attorney, Agent, or Firm—William B. Walter

[57] ABSTRACT

A taco holding tray to support formed taco shells for filling and serving has a series of linear parallel spaced round bottom "V"-shaped troughs, the inclined walls of which support all but about the last one inch wide portion of the shell. The taco holding tray also has a trough at each end of the parallel "V" troughs to catch and hold any spillage of filling from the taco shells.

2 Claims, 4 Drawing Figures

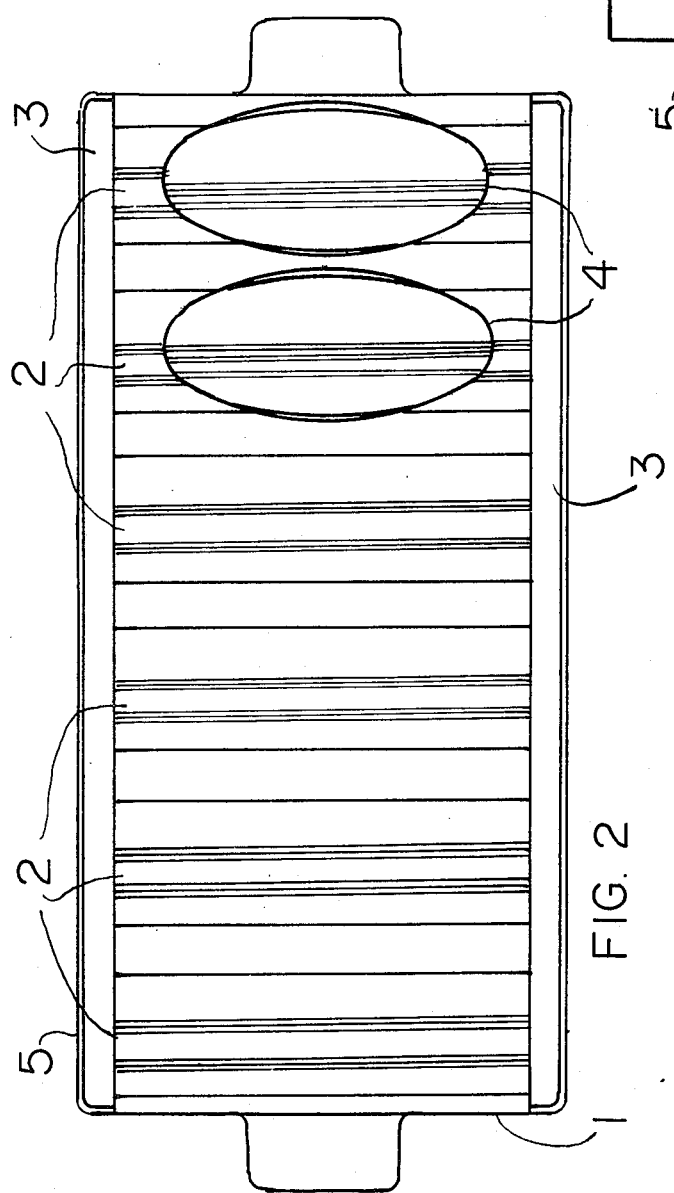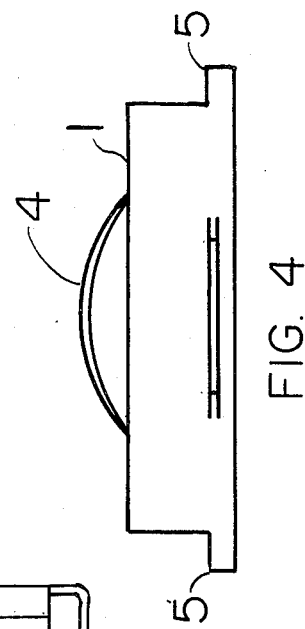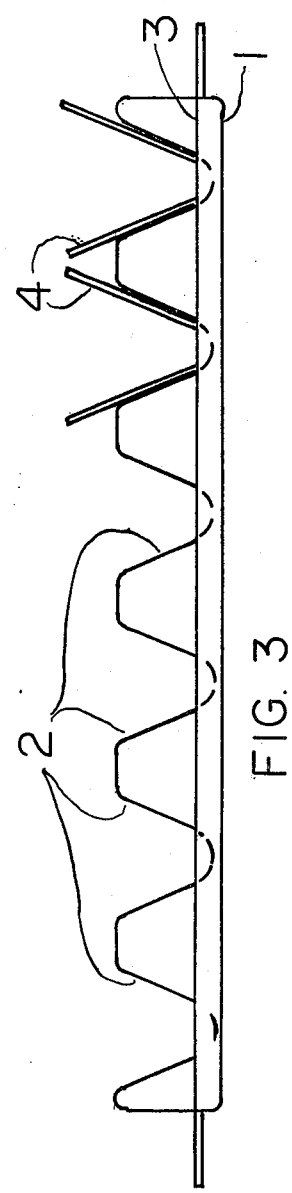

TACO HOLDING TRAY

BACKGROUND OF THE INVENTION

Tacos are a form of sandwich originating in Mexico in which the sandwich filling is contained in a tortilla by either rolling the tortilla around the filling, or cooking the tortilla in an open "V"-shape by folding it and holding it in that shape during cooking, and then serving the cooked folded tortilla, now called a taco shell, with a filling comprising a variety of finely cut foods such as lettuce, onions, meats, cheeses and similar foods to be added by choice of each one so served. Each taco shell is held in one hand while using fingers, tongs, fork or spoon with the other hand to place the filling in the taco shell. Since the filling materials are loose and light, spillage occurs easily. Once filled, the taco must be held in the hand until completely eaten, or else if it is placed on a plate between bites, much of the filling spills out onto the plate or table. "V"-shaped taco shells are thus poorly adapted to handle as ordinarily served.

Utensils have been devised in the past to hold the tortilla in the form desired for the "V"-shaped taco shell during cooking so that, when cooked, the taco shell will remain in the "V"-shape for filling and eating. Examples are shown in U.S. Pats. Nos. 3,705,042 to Muse and 3,817,163 to Kizziar et al. Neither of these devices is suggested or suitable for use in serving and filling the cooked and ready to eat taco shell. U.S. Pat. No. 199,595 to Stroub shows a rack to hold clams over a fire for cooking. This rack appears similar to the taco holding tray of my invention, but was not devised to hold tacos nor would it be suitable for this purpose because of its open bottom construction.

A need has therefore existed for a taco holder which will facilitate the serving and filling of taco shells, therefore giving a greater enjoyment to those eating this delicacy.

BRIEF SUMMARY OF THE INVENTION

The object of this invention is to provide an attractive and practical device for holding "V"-shaped taco shells for serving and filling, so that the ordinarily awkward and messy situation preparatory to and during eating is avoided.

This invention is a serving tray for one or more "V"-shaped taco shells having for each taco shell a supporting trough which conforms to the shape of the taco shell. Each supporting trough is as long as the taco shell at its fold, and the sides of the trough are high enough to support all but enough of the taco shell to grasp it free of the support so that it may be removed from the tray when filled for eating. An additional trough or space is provided at each end of each supporting trough to catch and hold excess filling materials to avoid spillage.

BRIEF DESCRIPTION OF THE DRAWINGS

FIGS. 1, 2, 3 and 4 of the drawings are a perspective, plan view, side elevation and end elevation respectively of a preferred embodiment of my taco holding tray.

DETAILED DESCRIPTION OF THE INVENTION

Figure 1:
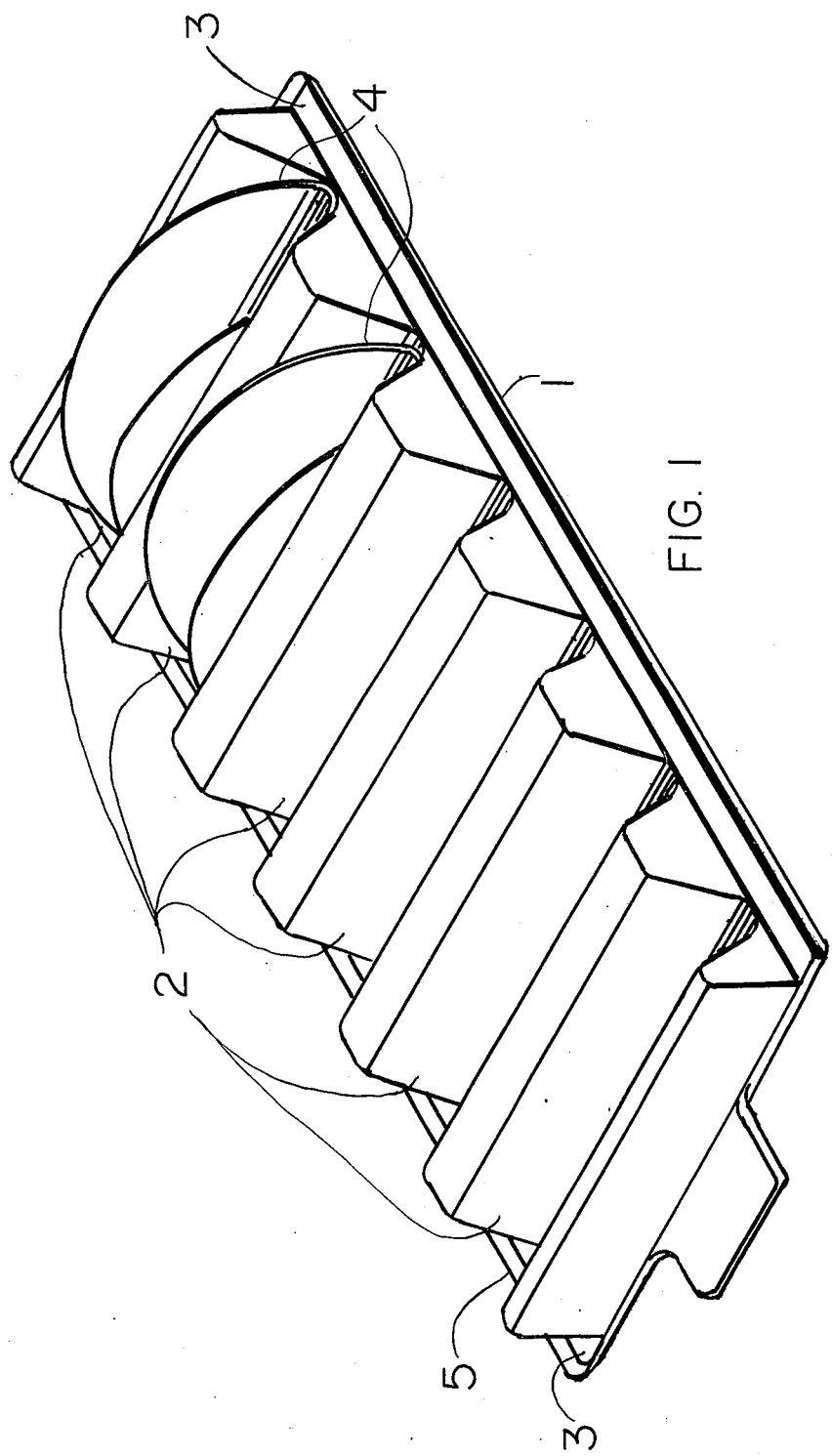

In a preferred embodiment of my taco holding tray 1 as shown in the drawings, taco supporting troughs 2 for six tacos are arranged as a series of transverse corrugations across most of the width of the holding tray 1. Shallow troughs 3 on each side of the holding tray 1 are thus adjacent to the ends of each taco supporting trough 2. These troughs 2 are preferably a little longer than the standard taco to be served so that the taco shell 4 can be easily placed in one of them without overlapping the overflow receiving means, troughs 3, to impair their effectiveness. As best seen in FIG. 3, the included angle of the supporting troughs 2 is preferably about 30° to 45° to allow the taco shell 4 to open sufficiently to facilitate filling. The height H of the supporting trough walls is ¾ to 1 inch (2 to 2.5 cm.) less than the length R of the taco shell 4 (the radius of the tortilla) thus leaving exposed and unsupported edges of the shell 4 to allow the diner to pick it up with his fingers. The supporting troughs 2 are so spaced as to allow for a separating space between adjacent taco shells 4. Support of a major portion of the taco shells 4 is desired as they are thin and brittle when cooked. Breakage of a taco when filled results in spilling to leave a mess on the clothing, table or floor.

In the preferred embodiment of my invention, the bottom of the tray at each side of the supporting troughs is level with the bottom of the supporting troughs 2, and this portion is about ½ inch (1.27 cm.) wide. A lip 5 at the outer edge of this flat portion serves with the flat portion to form a trough at each end of each supporting trough 2 to catch any overflow from taco shells 4 when filling.

The diameter of the bottom of the supporting troughs 2 is about ⅝ inch (1.6 cm.) to match the normal bending radius of a cooked and formed taco shell 4 so that as the filling is placed in the taco shell 4, the bottom will be well supported. The rounded bottom of the trough is also easier to clean than a sharp "V".

The taco holding tray 1 may be made of any of a variety of materials including papier mach'e for take-out orders from a restaurant, china, heavy aluminum foil, or ovenware which will allow placing the taco shells 4 in a warming oven before serving.

MANNER OF USE OF THE INVENTION

In use of my taco holding tray 1, the taco shells 4 are served in it with dishes containing a variety of fillings. The taco shells 4 are filled to individual taste while in the taco holding tray 1. If served in a taco holding tray 1 having one to three taco supporting troughs 2, each diner will have his own tray 1 and may put the partially eaten taco back in the tray 1 for support until picking it up again for another bite. This will allow eliminating the problem posed by the usual practice of placing the taco on its side on a plate to have the filling spill out.

I claim:

1. A taco holding tray to support "V"-shaped taco shells for filling and serving, comprising a tray having a linear trough for supporting taco shells, the length of which trough is at least as along as the length of the taco shell, said linear trough having a rounded bottom to support the normal bending radius of the formed taco shell and outwardly inclined side walls forming an open "V" of about 30° to 45°, the depth of which trough is such that the side walls will support all but enough of the sides of the taco shell for removal of the taco shell from the trough by the fingers, and an overflow catching means at each end of the trough to catch and hold excess filling material from said taco shells.

2. A taco holding tray to support "V"-shaped taco shells for filling and serving, comprising a tray having a multiplicity of taco shell supporting troughs, the length of each of which is at least as long as a taco shell, the bottom of each of which is rounded to support the normal bending radius of the taco shell, and the walls of which are outwardly inclined forming an open "V" of about 30° to 45°, the depth of each of which is such that the side walls will support all but enough of the sides of the taco shell for removal of the tacos shell from the trough with the fingers, and an overflow catching means at each end of each trough to prevent spillage of the filling, said means comprising an overflow trough adjacent to each end of each supporting trough with the bottom of the overflow trough being at least as low as the bottom of the supporting troughs whereby excess filling spilling out of either end of any of the support troughs will be caught by said overflow trough.

* * * * *